(12) United States Patent
De Pena et al.

(10) Patent No.: US 7,452,046 B2
(45) Date of Patent: Nov. 18, 2008

(54) METHOD FOR PREPARING A PRINT MASK

(75) Inventors: Alejandro Manuel De Pena, Sant Cugat Del Valles (ES); Joan Manuel Garcia, Sant Cugat (ES); Santiago Garcia Reyero, San Diego, CA (US); Andreu Gonzalez, Barcelona (ES); Andrew MacKenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 11/260,006

(22) Filed: Oct. 27, 2005

(65) Prior Publication Data

US 2006/0109291 A1    May 25, 2006

Related U.S. Application Data

(63) Continuation-in-part of application No. 10/974,370, filed on Oct. 27, 2004, now abandoned.

(30) Foreign Application Priority Data

Oct. 26, 2005    (EP) ................................ 05110011

(51) Int. Cl.
    *B41J 2/205*    (2006.01)
(52) U.S. Cl. ......................................... 347/15; 347/14
(58) Field of Classification Search .................... 347/15, 347/16, 37, 41, 19, 14
See application file for complete search history.

(56) References Cited

U.S. PATENT DOCUMENTS

| | | | |
|---|---|---|---|
| 5,661,507 A * | 8/1997 | Sperry ............................ 347/9 |
| 5,677,716 A * | 10/1997 | Cleveland ..................... 347/37 |
| 5,974,228 A | 10/1999 | Heitsch | |
| 6,019,454 A | 2/2000 | Serra et al. | |
| 6,067,405 A | 5/2000 | Serra | |
| 6,082,849 A | 7/2000 | Chang et al. | |
| 6,142,605 A | 11/2000 | Serra et al. | |
| 6,157,461 A | 12/2000 | Doron et al. | |
| 6,250,739 B1 | 6/2001 | Serra | |
| 6,367,908 B1 | 4/2002 | Serra et al. | |
| 6,542,258 B1 | 4/2003 | Garcia et al. | |
| 6,689,966 B2 | 2/2004 | Wiebe | |
| 6,788,432 B1 | 9/2004 | Garcia et al. | |
| 2003/0007185 A1 | 1/2003 | Aozzi | |
| 2003/0095165 A1 | 5/2003 | McClelland et al. | |
| 2003/0147091 A1 | 8/2003 | Otokita | |
| 2005/0046657 A1 | 3/2005 | Seki et al. | |
| 2005/0052706 A1 | 3/2005 | Nelson | |
| 2005/0052707 A1 | 3/2005 | Nelson et al. | |
| 2005/0053405 A1 | 3/2005 | Brouhon et al. | |

FOREIGN PATENT DOCUMENTS

WO    WO 01/26033    12/2001

* cited by examiner

*Primary Examiner*—Thinh H Nguyen

(57) ABSTRACT

A method for preparing a mask for multi-pass printing, comprises determining a characteristic satellite drop spray pattern for printing in a multi-pass mode with a printhead. Positions in the mask are filled with pass numbers. The pass numbers in a given position are selected based on considerations of interactions among main drops and satellite drops.

13 Claims, 13 Drawing Sheets

FIG. 1
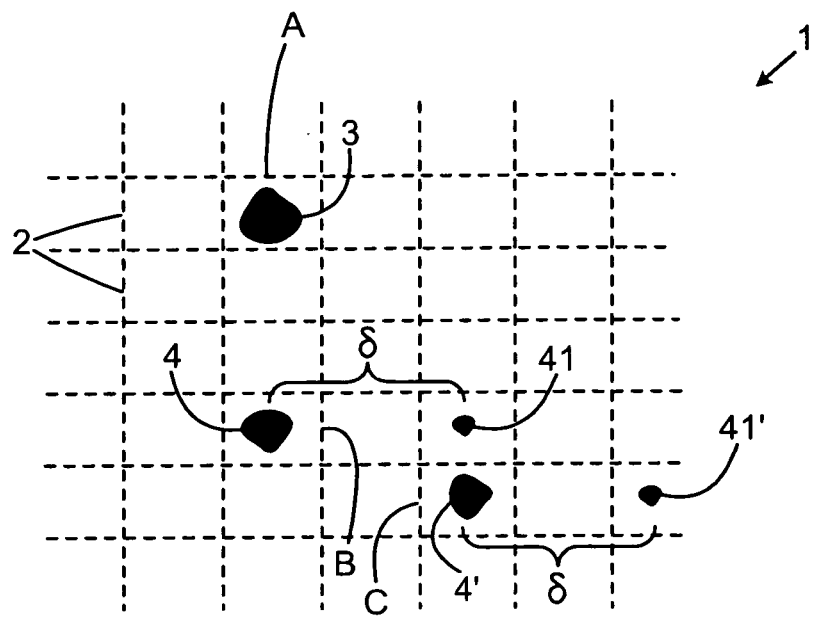
FIG. 2
FIG. 3
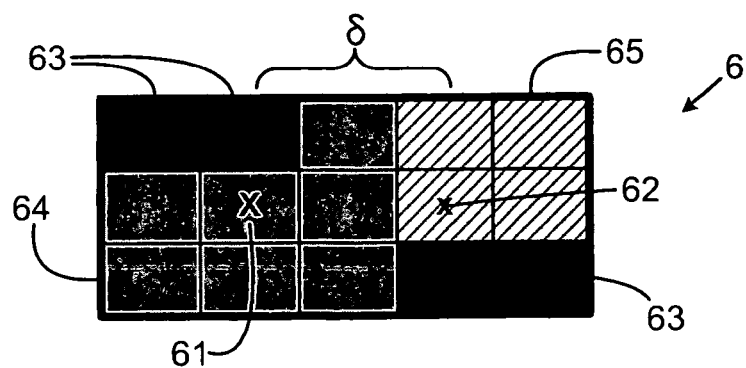

FIG. 4A

| 5 | 6 | 4 | 7 | 1 | 8 | 3 |
|---|---|---|---|---|---|---|
| 7 | 1 | 3 | 2 | 4 | 6 | 5 |
| 5 | 8 | ? | 6 | 3 | 1 | 8 |
| 7 | 4 | 1 | 8 | 2 | 5 | 3 |
| 8 | 3 | 2 | 5 | 4 | 1 | 6 |

FIG. 4B

| 5 | 6 | 4 | 7 | 1 | 8 | 3 |
|---|---|---|---|---|---|---|
| 7 | 1 | 3 | 2 | 4 | 6 | 5 |
| 5 | 8 | X | 6 | 3x | 1 | 8 |
| 7 | 4 | 1 | 8 |   |   | 3 |
| 8 | 3 | 2 | 5 | 4 | 1 | 6 |

FIG. 5

| 5 | 6 | 4 | 7 | 1 | 8 | 3 |
|---|---|---|---|---|---|---|
| 7 | 1 | 3 | 2 | 4 | 6 | 5 |
| 5 | 8 | ? |   |   |   |   |
|   |   |   |   |   |   |   |
|   |   |   |   |   |   |   |

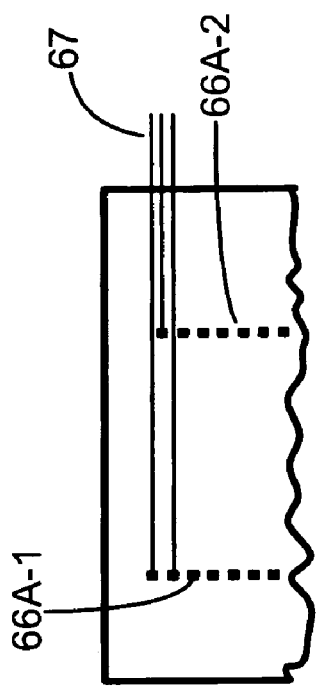
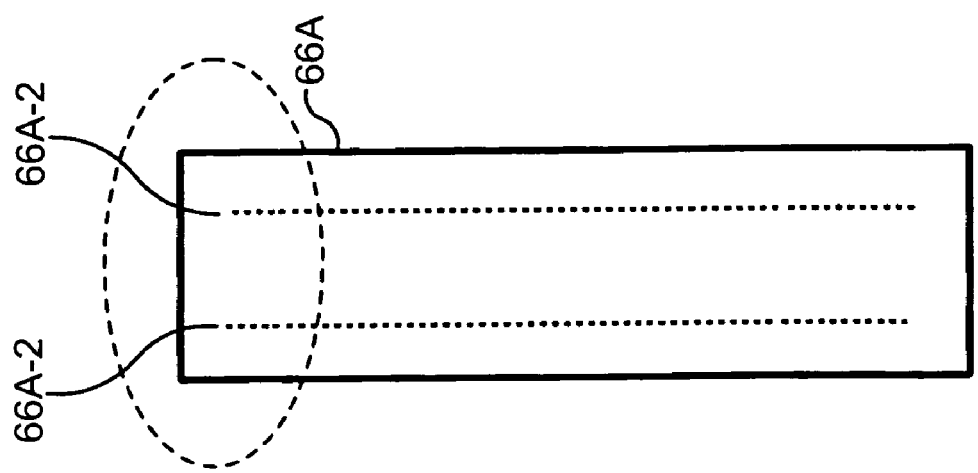

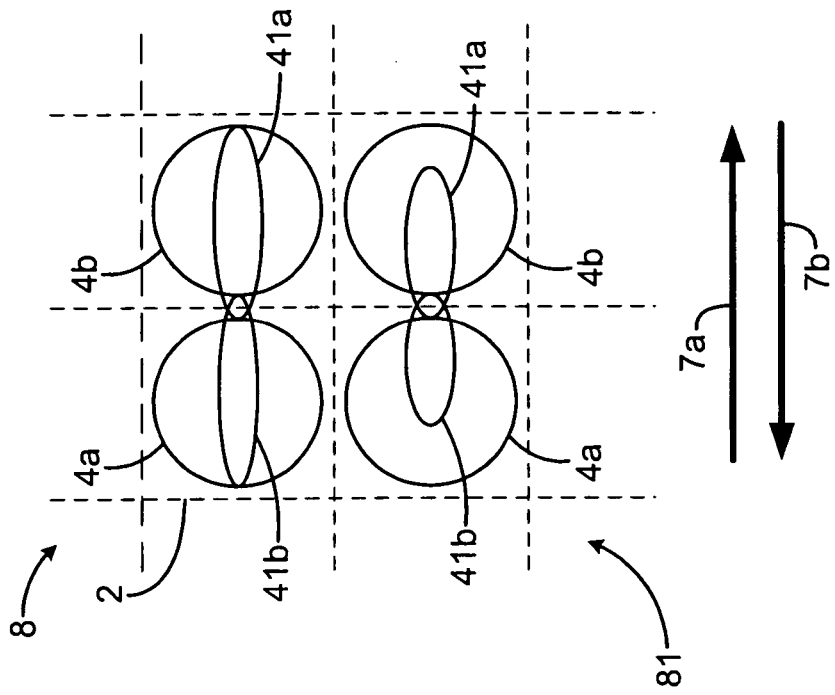
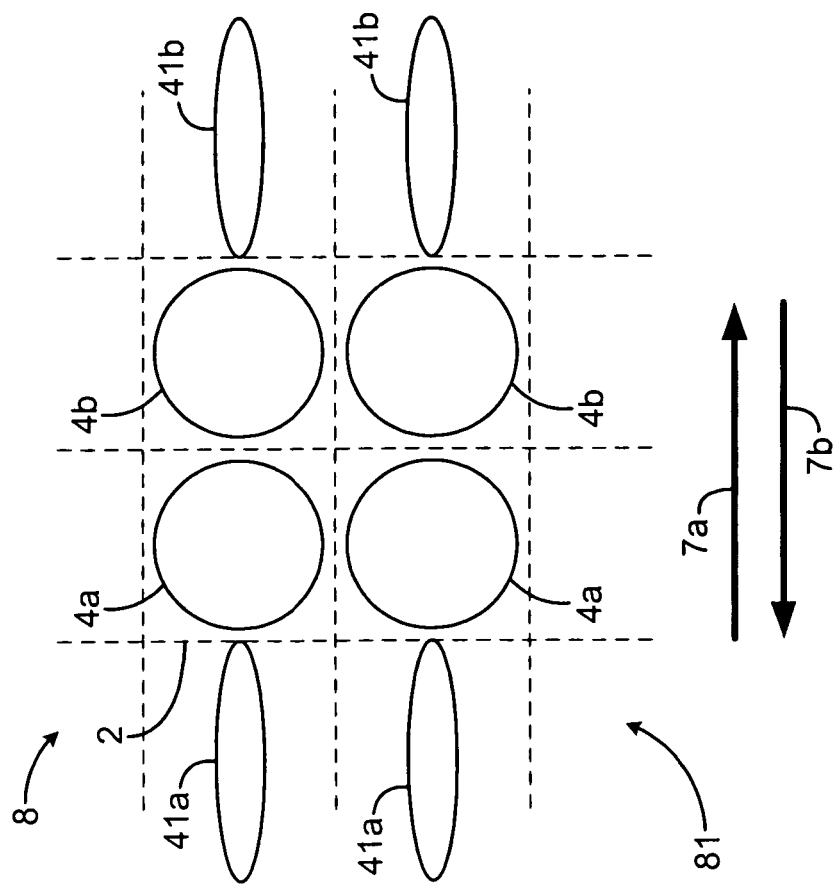

METHOD FOR PREPARING A PRINT MASK

RELATED APPLICATIONS

This application is a continuation in part of commonly assigned U.S. application Ser. No. 10/974,370 filed Oct. 27, 2004, now abandoned the entire contents of which are incorporated herein by reference.

BACKGROUND OF THE DISCLOSURE

In an ink-jet printer, droplets of ink or colorant are ejected through orifices and onto a printing medium in a two-dimensional pixel array to form an image. In a multi-pass print mode, the printhead may eject droplets from certain of the orifices on a given pass and from certain of the other orifices on subsequent or earlier passes. The overall pattern, size, timing and spacing of individual ink droplets or drops ejected from the ink-jet printer and printed within a given area of the media can affect the print quality of the image.

Print masks may be generated for given printheads operating in given print modes to control the particular pass of a multi-pass printmode in which a particular orifice corresponding to a particular pixel or cell in the image will be ejected. The print mask may be represented by an array of numbers, each one over a pixel, that represents the number of the pass (for example 1 through 8 in an 8-pass printmode) in which that pixel will be printed. In a dither mask, each value in the print mask represents a discriminator against which input levels are to be tested. Print masks can be generated incrementally using a matrix-based masking process which is based on various spatial and temporal constraints. Commonly assigned U.S. Pat. No. 6,542,258, for example, describes using a constraint matrix to generate a print mask.

Some printheads create characteristic "satellite" droplets which land in a consistent relation to the main drop being ejected. Satellite droplets may adversely affect image quality. Although the image effects due to a satellite may be less noticeable where the number of passes is high, in the case of print modes with fewer passes, the effects may be increased. In addition, where the size of satellite drop is large with respect to the main drop, the effects of satellite drops may be more visible.

BRIEF DESCRIPTION OF THE DRAWINGS

Features and advantages of the disclosure will be readily appreciated by persons skilled in the art from the following detailed description of exemplary embodiments thereof, as illustrated in the accompanying drawings, in which:

FIG. 1 illustrates exemplary dots ejected from a printhead onto a print medium.

FIG. 2 illustrates an exemplary embodiment of a print mask.

FIG. 3 illustrates an exemplary embodiment of a constraint matrix.

FIG. 4A illustrates an exemplary embodiment of a print mask with one unfilled position.

FIG. 4B illustrates an exemplary embodiment of a print mask with an exemplary embodiment of a constraint applied to the print mask.

FIG. 5 illustrates an exemplary embodiment of a partially filled out print mask.

Figures 6, 7A, 7B, 7C:
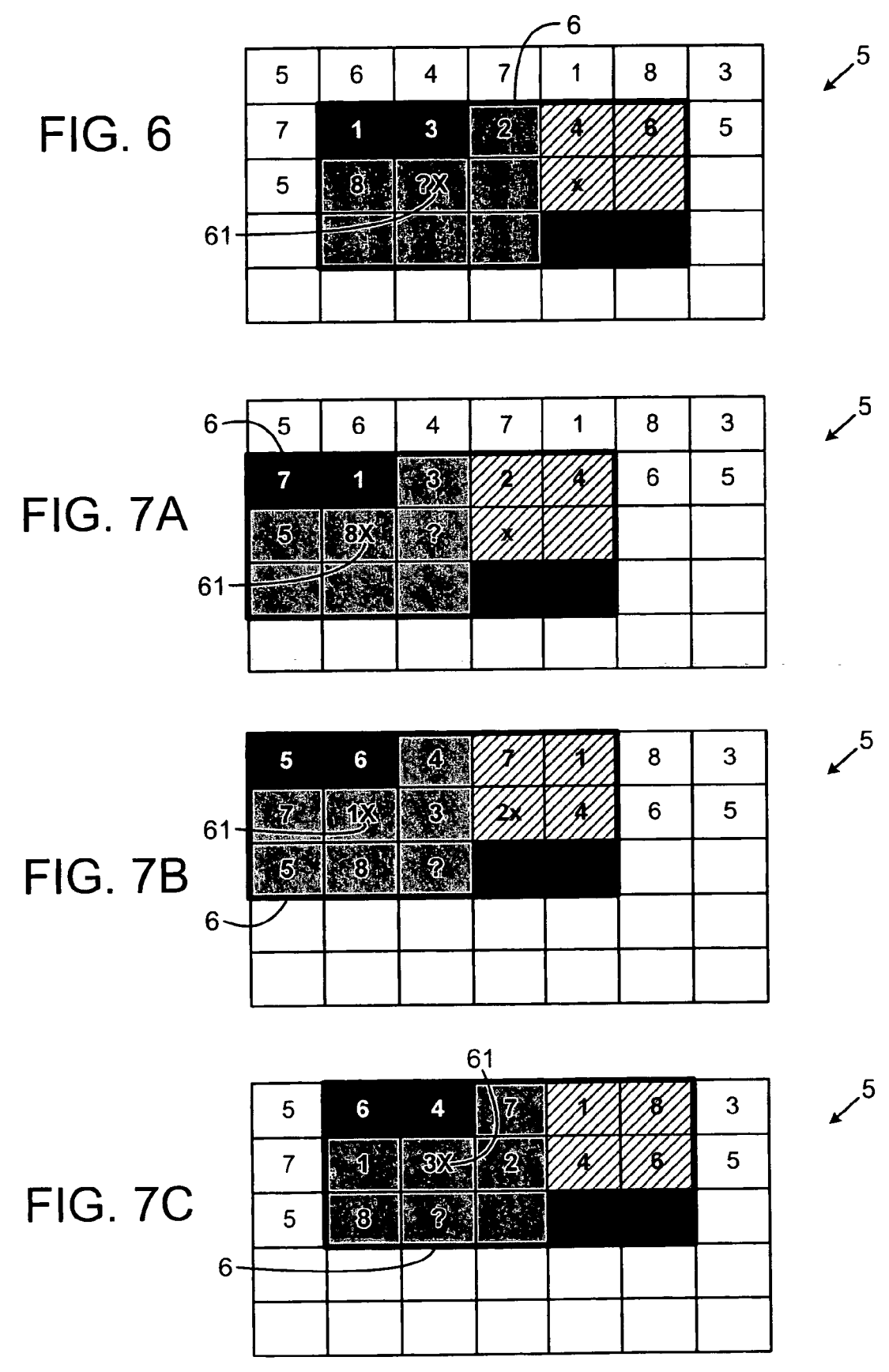

FIG. 6 illustrates the exemplary, partially filled out print mask of FIG. 5 with an exemplary constraint matrix applied to a position to be filled in.

FIGS. 7A-7E illustrate the exemplary, partially filled out print mask of FIG. 5 with an exemplary constraint matrix applied to positions of the print mask which have already been filled in.

FIG. 11 illustrates an exemplary plan view of an orifice plate.

FIG. 12 illustrates a detail view of the exemplary embodiment of the orifice plate of FIG. 11.

FIGS. 15A and 15B illustrate exemplary embodiments of printed images.

DETAILED DESCRIPTION OF THE DISCLOSURE

Figure 7D:
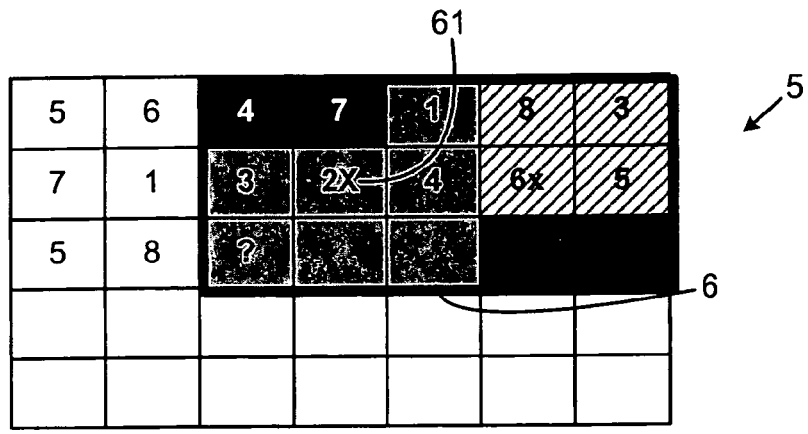

In the following detailed description and in the several figures of the drawing, like elements are identified with like reference numerals.

FIG. 1 illustrates a grid 1 in which each square represents the location of a pixel or cell 2 in an image. In a 600 dpi printer, for example, each cell may be about $\frac{1}{600}^{th}$ of an inch in length or about 40 um. Each cell represents the location where a drop may be ejected in printing an image. A printer may be designed with the intent of normally ejecting one droplet at one corresponding cell or pixel when a given ink ejection orifice or nozzle is fired. Droplet 3 in cell A, for example, represents a drop that was fired from an orifice when the printer signaled its corresponding nozzle or orifice to fire.

In some cases, due to the interaction of various factors which may include nozzle size and geometry, orifice plate and orifice surface characteristics, fluid characteristics, firing speed, speed of travel of the printer carriage and/or other factors which may be present, one or more "satellite" drops or droplets result from the firing of an orifice. Droplets 4 and 41, for example, represent a main drop 4 and a satellite drop 41 which resulted from the firing of the orifice corresponding to pixel B. The satellite has a separation δ from the main drop, where δ represents both the direction and distance from the main drop. In the example illustrated in FIG. 1, the satellite 41 is located in the same row and two columns to the right from the pixel B where the main drop 4 was printed. In an exemplary embodiment, the satellite drop 41 may be smaller than, be less visible than or be less perceptible than the main drop 4. In other exemplary embodiments, the satellite drop 41 may be nearly equal, equally or greater in size, visibility or perceptibility as the main drop 4, or be as visible or perceptible. In an exemplary embodiment, if satellite drops 41 are created with sufficient size, visibility or perceptibility, the cumulative effect of the satellite drops 41 on an image may have an effect on the image quality.

In an exemplary embodiment, for a given printhead, printhead design, or printhead architecture, the printhead may eject satellites from all or most of the orifices in a predictable, characteristic manner. In other words, on the average, each orifice can be expected to eject a satellite with the similar relative size, visibility or perceptibility and a mean displacement δ from its corresponding main droplet. In FIG. 1, for example, main drop 4' and satellite drop 41' are separated by about the same displacement δ as are main drop 4 and satellite 41. The size, shape and displacement of a satellite from the main drop may depend, for example, on the pen to paper spacing, the print velocity, the firing frequency, and/or the type of ink or colorant being used. The characteristic mean displacement δ may be derived from a general model or extracted from a calibration process on each individual printer.

For a given printhead design or specific printhead, information regarding the mean displacement δ for the characteristic satellite pattern can be developed by measuring the displacement of a satellite from the main drop. In an exemplary embodiment, this can be done for a given architecture or even a specific pen. For example, the mean displacement can determined by running a series of tests, analyzing the spray patterns and droplets produced by the printhead using various speeds, modes, inks and colorants. The tests can be performed on a number of similarly designed printheads and the results can be analyzed using statistical or other methods to determine the characteristic, expected satellite patterns for the printhead.

In an exemplary embodiment, a printer will eject droplets in a pattern on a print medium to form an image. The printer controller causes the printer to deposit the droplets in particular locations, cells or pixels so that the printed image will be reflective of image data to be printed. In a multi-pass print-mode, a controller may control the individual orifices in a printhead to fire during particular passes of the printhead in accordance with a printmask.

FIG. 2 illustrates an exemplary embodiment of a printmask 5. In an exemplary embodiment, a printmask may be in the form of a matrix wherein each position in the matrix corresponds to a pixel to be printed. The matrix is filled with numbers representing the pass number, of a multi-pass print-mode, in which a particular pixel is to be allowed to fire. The exemplary embodiment of FIG. 2 illustrates a printmask for an eight pass print mode. The first pixel 51 in the first row will be fired in the fifth pass, the next pixel to the right 52 in the sixth, the next pixel 53 in the fourth pass and so on. In an exemplary embodiment, a print mask may be cyclical in its vertical and horizontal dimension across an image.

In an exemplary embodiment, a method for generating the print mask 5 incorporates the effect of satellites 41, 41' (FIG. 1) on an image. In an exemplary embodiment with satellite drops of sufficient size and frequency, the satellite drops may introduce similar image quality factors as exist with respect to the printing of main drops. For example, it may be desirable to eject drops to ensure that drops printed on one pass have had adequate time to dry before another overlying pass is made in which a satellite or main drop lands within the same or neighboring printed area as a previously printed main or satellite droplet. Non-uniform or inconsistent drying may cause undesirable print quality effects including beading, bleeding and coalescence. In FIG. 1, for example, it may be desirable to print the pixel B in which the main drop 4 is printed on a different pass from the pass from pixel C in which the pixel 4' is printed, because of the proximity of the satellite drop 41 to the main drop 4'.

Factoring in constraints derived from considering the effect of neighboring satellites on image quality, in addition to the effect of main drops, may better approximate real pattern printing and improve image quality by further reducing the interaction among individual main drops and their satellites while they are drying. FIG. 3 illustrates a graphic representation of an exemplary embodiment of a constraint matrix 6 for use in building a print mask 5 (FIG. 4A) for a multi-pass print mode. The constraint matrix 6 comprises a first "pivot point" 61 (marked with an upper case X), corresponding to a main drop 4, 4' (FIG. 1) to be ejected, and a second "pivot point" 62 (marked with a small case x) corresponding to an expected, characteristic satellite droplet 41, 41' to be ejected at the same time as the main drop. Such a constraint matrix will take into account the effects of satellite drops on an image.

The constraint matrix of FIG. 3 can alternately be represented as:

$$[C] = \begin{bmatrix} 0 & 0 & 1 & 1_w & 1_w \\ 1 & X & 1 & 1_x & 1_w \\ 1 & 1 & 1 & 0 & 0 \end{bmatrix}$$

The print mask is generated by placing the pivot point 61 over a grid position of the print mask, and the other constraint matrix positions over corresponding other positions of the print mask, and determining a valid or best pass for printing the X pixel, in view of the constraints placed on the X pixel and the passes in which cells under the constraints are to be printed. In the exemplary embodiment of FIG. 3, the zero weights 63 (shown in black in FIG. 3) represent neighbors that do not place any constraints on the X pixel. The main constraints 64 (shown in grey in FIG. 3) include '1' constraints, representing constraints on the X pixel imposed by neighboring pixels. The '1' constraints represent pixels which constrain the X pixel by having to be printed in a pass which is at least one pass earlier or later than the pass in which the X pixel is printed—in other words, they cannot be printed during the same pass. The satellite constraints 65 (cross-hatched in FIG. 3) impose weighted constraints $1_w$ and $1_x$ correspond to constraints placed on firing the orifice corresponding to the X position, which result from taking into consideration the simultaneous ejection of a satellite drop at satellite position x. In other words, whereas the constraints on the main drop restrict printing of the main drop, based on various considerations affecting the image which may be caused by printing neighboring pixels with main drops which are too close in time to each other, the satellite constraints introduce additional levels of constraint, based on the desire to avoid effects caused by satellite drops which are printed too near in space and/or time to a pixel in which a neighboring pixel is printed. In an exemplary embodiment, the number of constraints to be considered may be limited so that adequate degrees of freedom remain to ensure that a program or controller implementing the constraint matrix to generate a print mask can find a solution in substantially each attempt.

In an exemplary embodiment, the satellite constraints 65 may be weighted by a number between 0 and 1 which is representative of the relative size of the satellite or its affect on the image. The weighted satellite constraints introduce constraints which take into account effects which may be caused by the presence of the satellite on a given pass. The constraints may be weighted less than the main constraints because the satellite may be smaller or less important to the image than the main droplet. In an exemplary embodiment, the weighting of the satellite pivotal point with respect to the main pivot point is indicative of the relative degree of forbiddance imposed by the satellite and may reflect its physical properties to some degree. For example, for very small satellites, the weighting may be very small. As the satellite size becomes relatively larger, the weighting may be correspondingly larger. Where a satellite is the same size as the main drop, then the satellite constraints may be given equal weight as the main constraints.

In order to calculate the best pass for a given mask position, constraints are applied not only to any neighbor of the main pivot point 61 in the mask, but also to any neighbor of a second pivot point 62, that is displaced by the mean displacement δ with respect to the pivot point corresponding to the main drop. In an exemplary embodiment, the δ may be dependent on the direction in which a given pass is printed. In order to include the relative sizes of the main drop and the satellite drop, the constraints are applied to the pivot point and its shifted replica with relative weights that reflect this size difference.

In an exemplary embodiment, a print mask may be generated sequentially along rows for successive columns. The print mask values may be selected randomly from passes which are not constrained by the constraint matrix. In an exemplary embodiment, the print mask value for a new position to be filled is determined by applying the constraint matrix to the print mask with the main pivot point 61 over the next position to be filled. In an exemplary embodiment, the main constraints and the satellite constraints are applied to determine the passes in which the pixel corresponding to the position to be filled should not be printed and the passes in which it is undesirable or less desirable to print the pixel. Then, the pass in which to print the pixel may be selected from among the otherwise allowable passes which are not constrained or otherwise undesirable.

In an exemplary embodiment, when no allowable passes can be found, the relative weights of the main constraints and satellite constraints may be used to determine the best pass for printing a particular pixel. In the exemplary embodiment of FIG. 3, the constraints are represented as simple 1 or zero constraints. In other exemplary embodiments, the main constraints may be weighted constraints.

FIG. 4A illustrates an exemplary print mask 5 with one, unfilled position '?'. FIG. 4B illustrates the exemplary embodiment of FIG. 4A with the main pivot point 61 of the constraint matrix of FIG. 3, superimposed or applied to the print matrix position '?'. Based on the '1' constraints in the main constraint positions 64 (FIG. 3) of the constraint matrix 6, the pass numbers 2, 8, 6, 4, 1, and 8 (in the grey boxes) are not "legal" pass numbers for printing the X pixel. In other words, the constraints forbid the printing of the X pixel in the same pass as the constrained pixels. The pass numbers in the cross-hatched satellite constraint positions 65 (FIG. 3), namely the pass numbers 4, 3, 6, 1, are undesirable under the weighted satellite constraints. The remaining legal numbers, based on the main constraints, include 3, 5 and 7. Of those, the pass number 3 is considered undesirable based on the satellite constraints. Accordingly, the best numbers for the pass in which the '?' should be printed are pass 5 or 7. In an exemplary embodiment, a print mask position may be selected randomly from among 'legal' or desirable numbers. In an exemplary embodiment, the print pass number for a given printmask position may be selected according to some other standard or condition. For example, in the example of FIG. 3, the number 7 might be selected as the best because a 5 is already in the same row.

FIG. 5 illustrates an exemplary partially generated or constructed print mask 5 for which the print mask pass values have been partially filled-in. The exemplary print mask has been filled in through the first two rows and the first two positions of the third row, from the left. FIG. 6 illustrates the printmask 5 of FIG. 5 with the constraint matrix 6 of FIG. 3 applied to the printmask. The main pivot point 61 (X) is placed over the next printmask position to be filled—'?'. The main constraints (shaded grey) show that the numbers 2 and 8 are forbidden and the cross-hatched, satellite constraints show that the numbers 4 and 6 are undesirable. Numbers that are still available include 1, 3, 5 and 7.

Figure 7E:
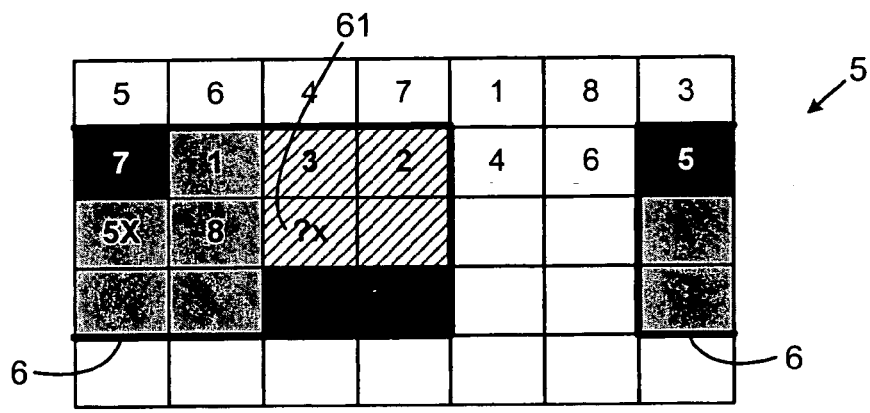
Figure 8:
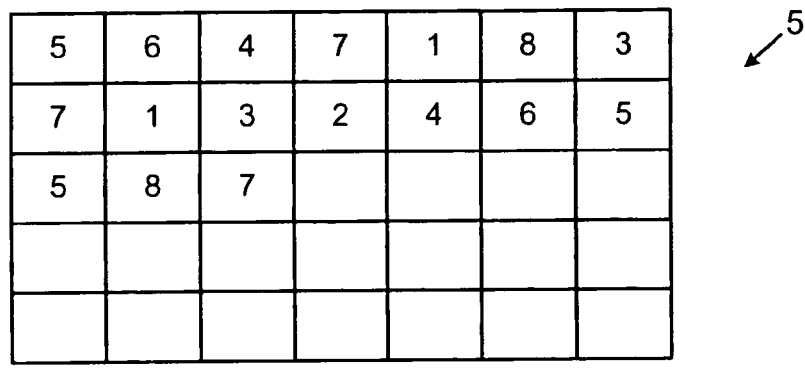
FIG. 8 illustrates the exemplary, partially filled out print mask of FIG. 5 with an additional position filled out.

In an exemplary embodiment, placing a number in a printmask may not only use an allowed, available, unconstrained number, but may also ensure that previously filled-in positions remain legal. In other words, the print mask values may have forward compatibility and backward compatibility with the constraint matrix. In an exemplary embodiment, this can be tested by applying the constraint matrix back over the previously filled-in positions. FIGS. 7A-E, for example, show the main pivot point 61 (X) position of the constraint matrix applied to positions which have already been filled and which would be constrained to some degree by the position—'?'— to be filled. The position to be filled, the '?' position, constrains each of the four, adjacent, already-filled-in positions, as shown in FIGS. 7A-7D. Accordingly, the '?' position cannot be filled in with a 1 (FIG. 7B), 2 (FIG. 7D), 3 (FIG. 7C) or 8 (FIG. 7A) if each of those positions are to continue being legal after filling in the new position. In addition, placing the constraint matrix over the position two positions to the left from the "?" position (FIG. 7E) shows that it would be undesirable for the newly-filled position to be a 5, as shown in FIG. 7E. Taking into account the application of the constraint matrix to the position to be filled and checking the legality of the available passes against the already-filled in positions, numbers 1, 2, 3 and 8 are forbidden and 4, 5 and 6 are undesirable. Accordingly, the only available and not undesirable number is 7. FIG. 8 illustrates the print mask with the new position filled with the 7.

FIG. 7E illustrates an exemplary embodiment in which the constraint matrix is a "circular" condition when applied to the print mask. When the constraint matrix is applied to the right side of the print mask, such that the constraint matrix extends beyond the edge of the print mask, the constraint matrix wraps around to the opposite edge of the print mask. This is the case because, in an exemplary embodiment, the print mask may be repetitive both across and up and down the print head. In other words, the order in which the various pixels are printed relative to the pixels in its immediate vicinity is repeated across the image for the entire width of the image and down the entire length of the image. In an exemplary embodiment, the size of a printmask may be a design choice which may depend, at least in part, on memory requirements and the available amount of memory. In an exemplary embodiment, a small, low-cost printer may have relatively low available memory and a corresponding relatively smaller print mask—for example 16×16. In an exemplary embodiment, a large format printer with sufficient available memory may have a printmask adapted to the printhead size, which may reduce masking artifacts. For example, a printhead with 512 nozzles may have a 512×384 printmask.

Figure 9:
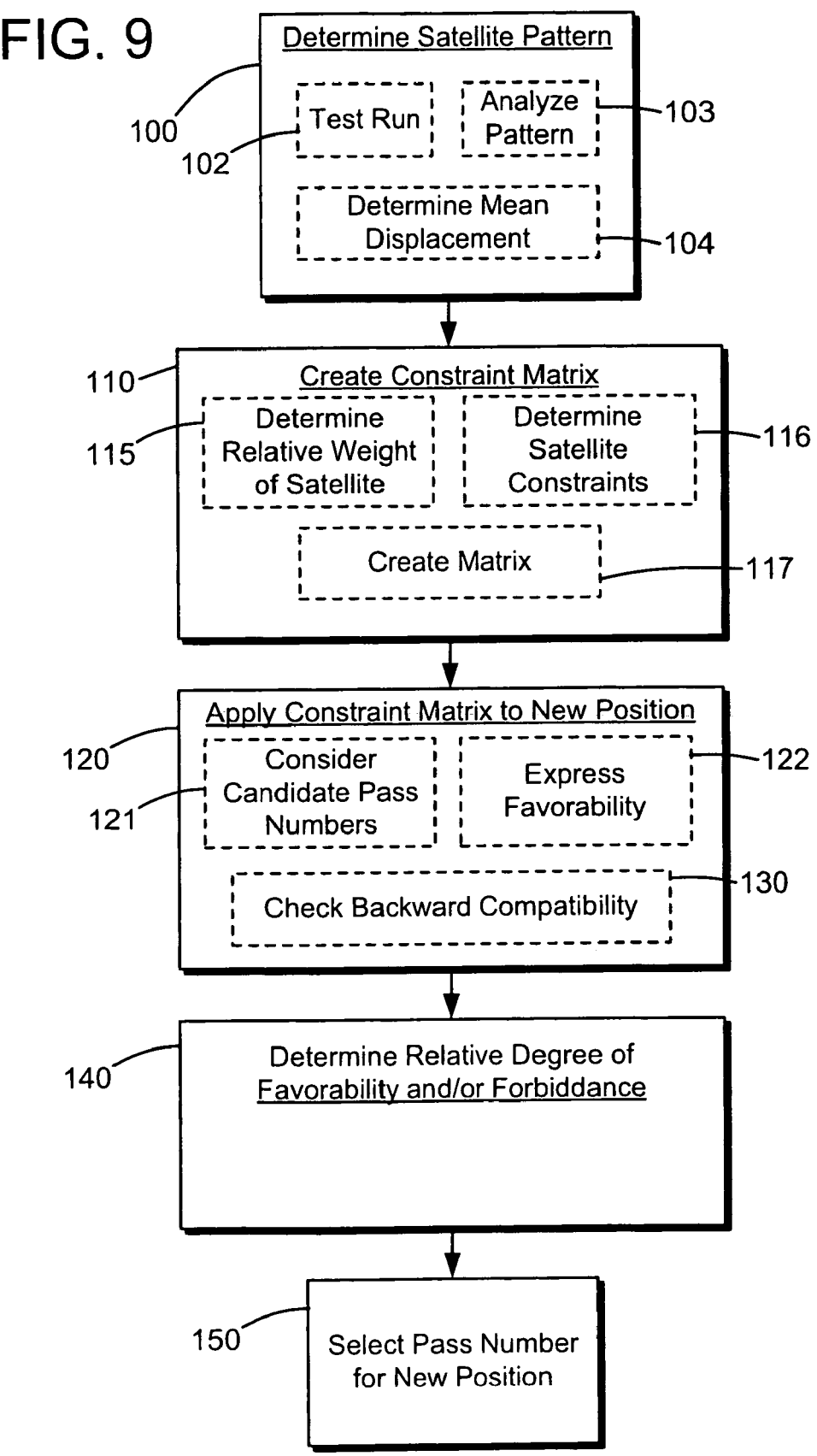
FIG. 9 illustrates an exemplary method of generating a print mask.

FIG. 9 illustrates an exemplary method for constructing or generating a print mask. In an exemplary embodiment, the method comprises first determining 100 a satellite pattern for a printhead, creating 110 a constraint matrix with main constraints and satellite constraints, applying 120 the constraint matrix to a print mask with the main pivot point at the position to be filled, determining 140 the allowability, non-allowability and/or relative degree of forbiddance or favorability for pass numbers at the position to be filled, and selecting 150 a pass number for filling the position in the print mask to be filled.

In an exemplary embodiment, determining a satellite pattern for a printhead comprises performing test runs 102, analyzing 103 spray patterns and determining 104 a mean displacement of a characteristic satellite drop or drops. In an exemplary embodiment, creating 110 a constraint matrix comprises determining 115 the relative weight to be given to satellite constraints, for example based on the size of a characteristic satellite, determining 116 constraints imposed by the satellite drops, and creating 117 a matrix representative of constraints imposed on a main pivot point based on positions neighboring the main pivot point and representative of constraints imposed on the main pivot point based on positions neighboring a secondary pivot point corresponding to a satellite drop.

In an exemplary embodiment, applying 120 the constraint matrix to a new position to be filled in the print mask comprises considering 121 candidate pass numbers, for a particular position in the mask, and expressing the favorability 122 of each candidate pass number, with regard to each of plural positions neighboring the main drop and with regard to each of plural positions neighboring the satellite drop in the form of respective weights. In an exemplary embodiment, applying constraint matrix to a new position also comprises checking 130 the backward compatibility of candidate pass numbers by placing the constraint matrix over positions which have already been filled 130, and determining the favorability of candidate pass numbers, in part, on a desire to have previously filled in pass numbers remain "legal" under their constraints after filling in the new number.

In an exemplary embodiment, producing a printmask by applying 120 the constraint matrix to the print mask with the main pivot point at the position to be filled may produce a first order of a print mask. Checking 130 the backward compatibility of a candidate pass number may result in a printmask with improved print quality with respect to the first order printmask. In an exemplary embodiment, checking 130 the backward compatibility may be omitted where the first order printmask results in satisfactory print quality or where the improvement over the first order printmask is small.

In an exemplary embodiment, determining 140 allowed, not allowed, and or relative degree of forbiddance or favorability for pass numbers at the particular location comprises consolidating the weights to obtain a measure of favorability for each candidate pass number. The new position is filled with a pass number by selecting 150 a pass number for the position from among the candidate pass numbers based on the measure of favorability. In an exemplary embodiment, this process is repeated for each position in the mask.

In an exemplary embodiment, a multi-pass print mode comprises a bi-directional print mode. In other words, the printhead may move in one direction, for example a right-to-left direction, on some of the passes and in another direction, for example a left-to-right, on other passes. In an exemplary embodiment, the mean displacement δ while printing in one direction may be different, either in magnitude or direction, from the mean displacement δ when printing in the other direction. In such embodiments, unique constraint matrices may be developed reflecting the different mean displacement δ and/or the different relative size and corresponding weights of the constraints for printing in each printing direction. For example, a right printing constraint matrix for determining the print mask values of rows printed in a right-moving direction and a left printing constraint matrix for use in determining the print mask values for rows printed in a left-moving direction. For each printing pass of a multi-pass, bi-directional print mode, only the corresponding weight values for the appropriate directional constraint matrix are applied to determine the print mask values for each cell or pixel.

Figure 10:
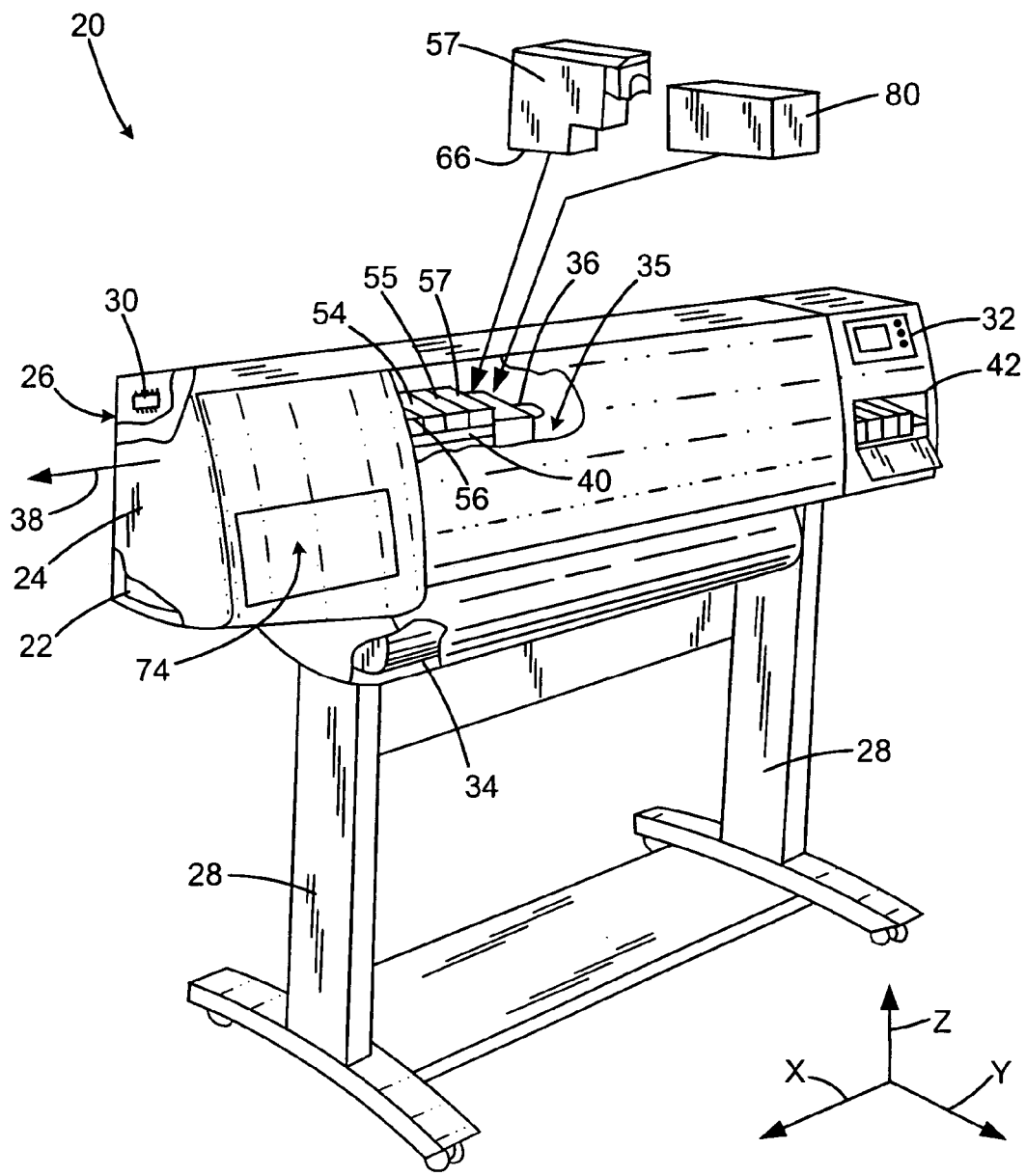
FIG. 10 illustrates an exemplary embodiment of a printer.

Embodiments of a print mask constructed or generated in accordance with exemplary methods described herein may be practiced in a variety of printers. FIG. 10 illustrates an embodiment of a printer 20, which may be used for recording information onto a recording medium, such as paper, textiles, and the like, in an industrial, office, home or other environment. For instance, it is contemplated that an embodiment may be practiced in large scale textile printers, desk top printers, portable printing units, copiers, cameras, video printers, and facsimile machines, to name a few.

While the printer components may vary from model to model, the printer 20 includes a chassis 22 surrounded by a housing or casing enclosure 24, together forming a print assembly portion 26 of the printer 20. In an exemplary embodiment, the print assembly portion 26 may be supported by a desk or tabletop, however; in the embodiment of FIG. 10, the print assembly portion 26 is supported with a pair of leg assemblies 28. The printer 20 also has a printer controller 30, illustrated schematically as a microprocessor, that receives instructions from a host device (not shown). In an exemplary embodiment, the host device may be, for example, a computer or a computer aided drafting (CAD) computer system. The printer controller 30 may also operate in response to user inputs provided through a key pad and a status display portion 32, located on the exterior of the casing 24. A monitor coupled to the host device may also be used to display visual information to an operator, such as the printer status or a particular program being run on the host device.

A recording media handling system may be used to advance a continuous sheet of recording media 34 from a roll through a print zone 35. Moreover, the illustrated printer 20 may also be used for printing images on pre-cut sheets, rather than on media supplied in roll 34. The recording media may be any type of suitable sheet material, such as, for example, paper, poster board, fabric, transparencies, mylar, vinyl or other suitable materials. A carriage guide rod 36 is mounted to the chassis 22 to define a scanning axis 38, with the guide rod 36 slideably supporting a carriage 40 for travel back and forth, reciprocally, across the print zone 35. A carriage drive motor (not shown) may be used to propel the carriage 40 in response to a control signal received from the controller 30.

The printer 20 of this exemplary embodiment includes four print cartridges 54-57. In the print zone 35, the recording medium receives ink from cartridges 54-57. The cartridges 54-57 are also often called "pens" by those in the art. One of the pens, for example pen 57, may be configured to eject black ink onto the recording medium, where the black ink may contain a pigment-based or a dye-based ink or other type of ink. Pens 54-56 may be configured to eject variously colored inks, e.g., yellow, magenta, cyan, light cyan, light magenta, blue, green, red, to name a few. For the purposes of illustration, pens 54-56 are described as each containing a dye-based ink of the colors yellow, magenta and cyan, respectively, although it is apparent that the color pens 54-56 may also contain pigment-based inks in some implementations. It is apparent that other types of inks may also be used in the pens 54-57, such as paraffin-based inks, as well as hybrid or composite inks having both dye and pigment characteristics.

The printer 20 of this exemplary embodiment uses an "off-axis" ink delivery system, having main stationary reservoirs (not shown) for each ink (black, cyan, magenta, yellow) located in an ink supply region 74. In this respect, the term "off-axis" generally refers to a configuration where the ink supply is separated from the print heads 54-57. In this off-axis system, the pens 54-57 may be replenished by ink conveyed through a series of flexible tubes (not shown) from the main stationary reservoirs so only a small ink supply is propelled by carriage 40 across the print zone 35 which is located "off-axis" from the path of printhead travel. As used herein, the term "pen" or "cartridge" may also refer to replaceable printhead cartridges where each pen has a reservoir that carries the entire ink supply as the printhead reciprocates over the print zone.

The illustrated pens 54-57 have printheads, e.g. printhead 66, which selectively eject ink to form an image on a sheet of media 34 in the print zone 35. In an exemplary embodiment, these printheads have a large print swath, for instance about 22.5 millimeters high or higher, although the concepts described herein may also be applied to smaller printheads. In an exemplary embodiment, the printheads each have an orifice plate with a plurality of nozzles formed there through. FIG. 11 shows in diagrammatic plan view an exemplary orifice plate or orifice layer 66A with a plurality of nozzles or orifices.

The nozzles of each printhead are typically formed in at least one, but typically two or more generally linear arrays along the orifice plate. For example, as shown in FIG. 11, the nozzles are formed in linear arrays 66A-1 and 66A-2. The term "linear" as used herein may be interpreted as "nearly linear" or substantially linear, and may include nozzle arrangements slightly offset from one another, for example, in a zigzag arrangement. Each linear array is typically aligned in a longitudinal direction substantially perpendicular to the scanning axis 38, with the length of each array determining the maximum image swath for a single pass of the printhead. The arrays can be staggered with respect to each other, so that an offset along the longitudinal direction enables higher resolution printing. For example, say the nozzles in array 66A-1 and array 66A-2 are spaced by 1/300 inch or 1/600 inch spacings. With the staggered array feature, the resolution can be increased to 1/600 or 1/1200, or to 600 dpi or 1200 dpi. FIG. 12 is an enlarged fragmentary view of the indicated region of FIG. 11, showing rows 67 printed by the staggered nozzles of the two arrays.

Figure 13:
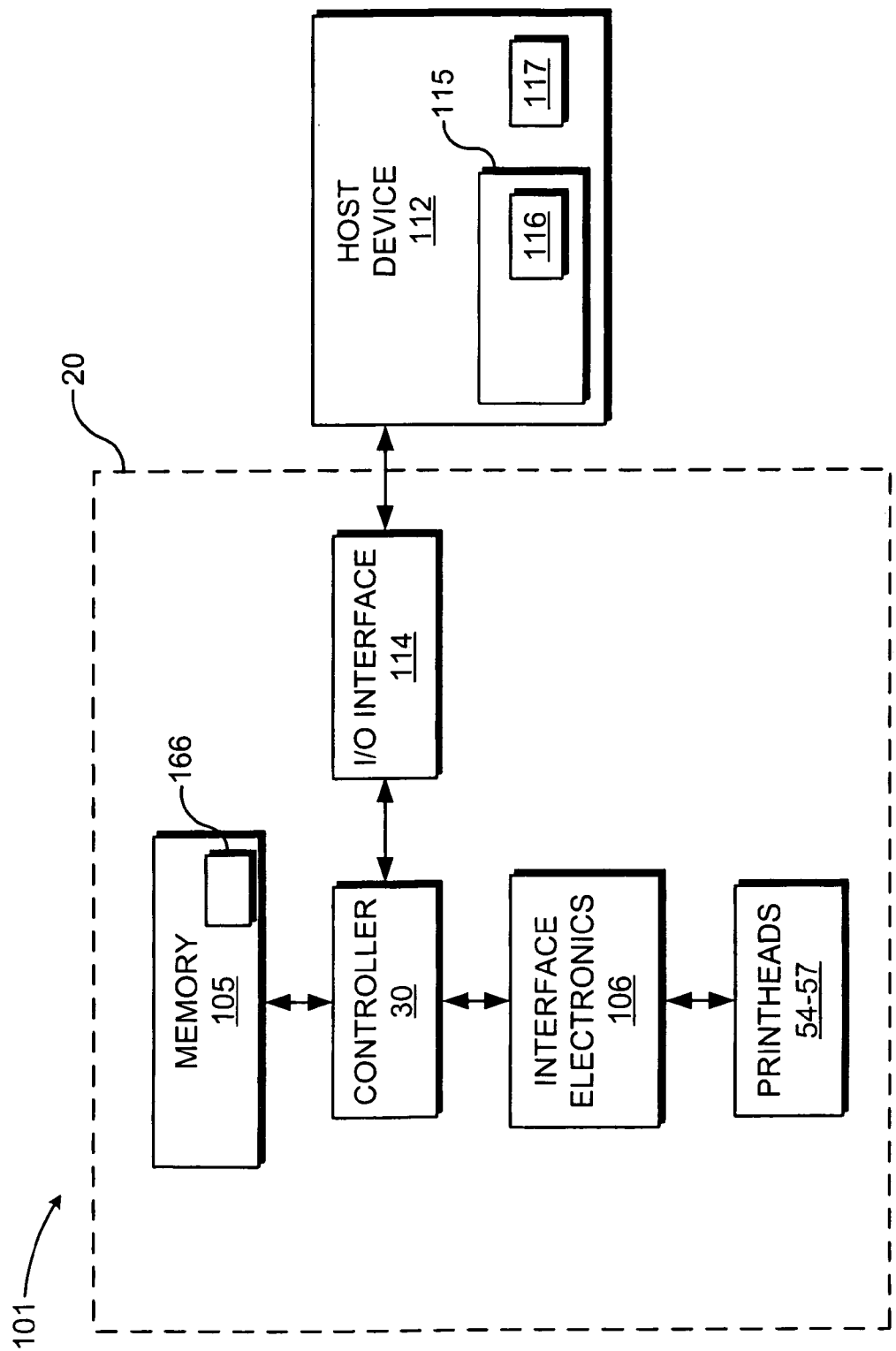
FIG. 13 an exemplary block diagram of elements of an embodiment of a printing system.

Referring to FIG. 13, there is illustrated an exemplary block diagram of elements of an embodiment of a printing system 101 comprising a printer 20 and a host device 112. The following description illustrates one exemplary manner in which a printer 20 may be operated. It is to be understood that the following description of FIG. 13 is but one manner of a variety of different manners in which such a printer 20 may be operated.

In the exemplary embodiment of FIG. 13, the printer 20 is shown as including four printheads 54-57. However, exemplary embodiments of print masks may be implemented on printers with fewer or more printheads.

The printer 20 may also include interface electronics 106 configured to provide an interface between the controller 30 and the components for moving the carriage 40, e.g., encoder, belt and pulley system (not shown), etc. The interface electronics 106 may include, for example, circuits for moving the carriage, the medium, firing individual nozzles of each printhead, and the like.

The controller 30 may be configured to provide control logic to implement programmed processes for the printer 20, e.g. to serve as a print engine, which provides the functionality for the printer. In this respect, the controller 30 may be implemented by a microprocessor, a micro-controller, an application specific integrated circuit (ASIC), and the like.

The controller 30 may be a computer program product interfaced with a memory 105 configured to provide storage of a computer software, e.g. a computer readable code means, that provides the functionality of the printer 20 and may be executed by the controller. The memory 105 may also be configured to provide a temporary storage area for data/files received by the printer 20 from a host device 112, such as a computer, server, workstation, and the like. The memory 105 may be implemented as a combination of volatile and non-volatile memory, such as dynamic random access memory ("RAM"), EEPROM, flash memory, hard drive storage and the like. Alternatively the memory 105 may be included in the host device 112. In an exemplary embodiment, a print mask with print mask values reflecting constraints indicative of main drop considerations as well as constraints indicative of satellite drop considerations, may be implemented by or be stored in memory 105 and/or be implemented by the controller 30.

The controller 30 may further be interfaced with an I/O interface 114 configured to provide a communication channel between the host device 112 and the printer 20. The I/O interface 114 may conform to protocols such as RS-232, parallel, small computer system interface, universal serial bus, etc.

In an exemplary embodiment, a print mode is used to print an image. One of the parameters of the print mode is the number of passes needed to print the image. For an n-pass print mode the printer uses n passes to finish a given swath. This means that at every printing pass only one nth of the dots are being printed. The splitting of the image data in passes is done using a print mode mask. This mask contains the pass number when each pixel is going to be printed. In an exemplary embodiment, the print mask may be converted into n separate, binary print mode masks, one for each pass, which are logically "ANDed" with the image data. If there is a '1' value in the same position for the image and for the mask, a drop is going to be fired.

Figure 14:
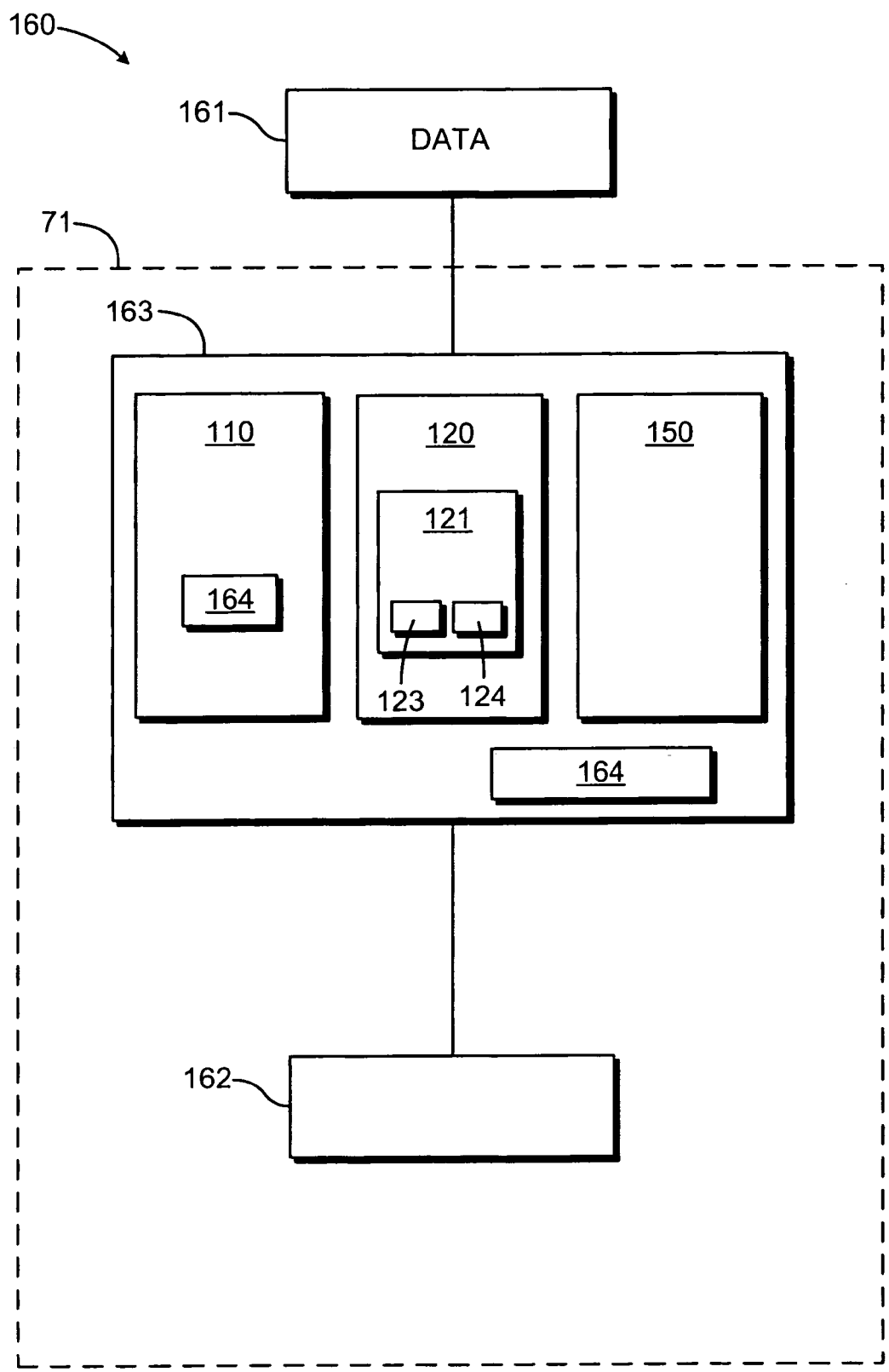
FIG. 14 illustrates an exemplary embodiment of a method of printing.

In an exemplary embodiment illustrated in FIG. 14, a method 160 of printing may include a host device 112 (FIG. 13) providing 161 image data 118, which may include, for example, reference position data 119 (FIG. 13), to be printed. The image data 118 may be transferred to a printer 20 (FIG. 10) for printing 162. A controller 30 may control a printhead 66 or printheads 54-57 (FIG. 13) to print the image 8 (FIG. 15B, below) in accordance with the image data 118.

In an exemplary embodiment, the method may include "hiding" satellites 41 (FIG. 1) within a printed image 8 by printing the drop 4 associated with the satellite in a position such that the satellite 41 (FIG. 1) falls in a pixel position which is also printed with a drop 4, as described further below.

In an exemplary embodiment, the controller may generate 163 a printmask. In an exemplary embodiment, generating 163 the print mask may include creating 110 a constraint matrix, applying 120 the constraint to a new print mask position and selecting 150 a pass number for the new position. In an exemplary embodiment, generating 163 the print mask may include identifying 164 the location of edge pixels of an image.

In an exemplary embodiment, an "edge" pixel position is a pixel position in an image which is to be printed and which is horizontally adjacent to a pixel position which is not printed on one side and is horizontally adjacent to a pixel position which is also printed on the other side, where horizontal refers to a direction parallel with the direction of travel of a printhead across the medium during printing. By causing an edge pixel or pixels to be printed only in such a direction for which the corresponding satellite or tail lands within the image, for example on a neighboring printed pixel position, the edge acuity of a printed image may be improved. In an exemplary embodiment in which the image is a reference grid of 2×2 dots, every pixel to be printed may be an edge pixel. In the case of an image with larger image portions, the controller may analyze the image to identify the edge positions.

In alternate embodiments, an "edge" pixel position may be any position on an edge of plurality of printed pixels, for example contiguous printed pixels, forming an image. In an exemplary embodiment, the relative motion between the printhead and a print medium may be provided by moving the printhead on a carriage past the print medium, by moving the print medium past the printhead, and/or by a combination of motions of the printhead and/or the medium. In an exemplary embodiment, the relative motion may be horizontal, vertical, or any other direction. In an exemplary embodiment, the edge pixels may be printed when the relative motion of the printhead and the medium causes a satellite or tail to fall within the nominal edges of the image to increase the edge acuity. In an exemplary embodiment where a satellite or tail may be formed upon emission of a droplet to print an edge pixel of an image, these principles may be applied to control the printhead to emit an edge pixel droplet to hide the satellite or tail by having it fall within an image being printed.

For example, in an exemplary embodiment, a printhead may have nozzles in a static array with print medium, for example paper, which moves past the printhead in some direction, for example a vertical direction. In an exemplary embodiment, such a printhead may create a satellite or tail with a predicable direction and distance from the nominal position of a pixel to be printed. In an exemplary embodiment, the direction of the satellite from the main drop may depend, at least in part, on the direction of relative movement of the printhead with respect to the medium when the drop is emitted. In the case of an edge pixel, the printhead may be controlled to emit an edge pixel droplet when the medium and the printhead have a relative movement with respect to each other such that the associated satellite or tail lands within the image.

In an exemplary embodiment, generating 163 the print mask may include providing 165 a directional constraint to a constraint mask for the edge pixel positions. In an exemplary embodiment, the directional constraint may be used to hide 71 a satellite or tail within the image. For example, where an emitted droplet corresponding to a printed pixel position causes a satellite 41 or tail to be created in a horizontally adjacent pixel position in a direction away from the pixel position corresponding to the direction of travel of the printhead, a left side edge pixel may be printed in a left-to-right pass (which may be, for example an odd-numbered pass) and a right side edge pixel may be printed in a left-to-right pass (which may be, for example an even-numbered pass). In each case, the satellite or tail may be printed in a neighboring pixel position which is also printed. In this way, the satellite or tail may be hidden 71 in that it does not show up in a position that it not otherwise printed.

In an exemplary embodiment, hiding 71 a satellite or tail of an edge pixel position may include creating 110 the constraint matrix, providing 165 a directional constraint, applying 120 the constraint matrix to a new position and selecting 150 a pass number. In an exemplary embodiment, these steps alone, or in combination, cause edge pixel positions to be printed on a pass with a printhead direction which may hide the satellites or tails within the printed portion of the image.

In an exemplary embodiment, providing a directional constraint may cause an edge pixel to be printed in a pass in which the printhead moves in a direction to hide the satellite or tail within the dot or image. In an exemplary embodiment, the directional constraint may cause left side edge pixels to print on odd numbered passes and right side edge pixels to print on even numbered passes, where the printhead moves across the medium in a left-to-right direction for odd-numbered passes and in a right-to-left direction for even-numbered passes. In an exemplary embodiment, creating a constraint matrix may include providing a directional constraint which disallows a right edge position on odd passes and disallows a left edge position from printing on even numbered passes.

In an exemplary embodiment, applying 120 the constraint matrix to a new position, where the new position is an edge position, may include considering 121 pass numbers where considering 121 pass numbers may include considering only odd pass numbers 123 or considering only even pass numbers 124, depending on whether the position is a left edge position or a right edge position. In an exemplary embodiment, other non-edge positions may be considered without constraining the position to odd or even passes only.

In an exemplary embodiment, hiding 71 a satellite or tail may also include considering candidate pass numbers 121. In an exemplary embodiment, where the new pixel position is an edge pixel position, considering 121 candidate pass numbers may include considering only odd pass numbers 123 or considering only even pass 124 numbers for edge pixel positions, depending on whether the edge pixel position is on the right edge or left edge of the image and on the directionality of the tail or satellite.

In an exemplary embodiment, hiding 71 a satellite or tail may also include selecting 150 a pass number for the edge position. In an exemplary embodiment, selecting 150 a pass number for an edge position may include selecting a pass such that the satellite or tail associated with the edge position falls within the image being printed.

FIGS. 15A and 15B illustrate exemplary images 8 to be printed. In an exemplary embodiment, the image 8 may include 4×4 patterns of droplets 4a, 4b printed in adjacent pixel positions 2. The image 8 may be, for example, a reference dot 81 to be used in digital pen and paper (DPP) technology. In the exemplary embodiments of FIGS. 15A and 15B, a printhead emits main droplets 4a, 4b for each pixel position 2. In an exemplary embodiment, emitting the main droplets 4a, 4b may create satellites 41a, 41b corresponding to the main drops 4a, 4b. In an exemplary embodiment, the satellites 41a, 41b may be formed in a position approximately within a neighboring pixel position and in a direction away from the printed pixel position corresponding to the direction of travel of the printhead 7a, 7b. In an exemplary embodiment, all four pixels of a 4×4 dot are edge pixels.

In FIG. 15A, the left-hand pixels 4a were printed with a printhead direction of travel 7b corresponding to a right-to-left pass of the printhead and the right-hand pixels 4b were printed with a printhead direction of travel 7a corresponding to a left-to-right pass of the printhead. In FIG. 15B, the left-hand pixels 4a were printed with a printhead direction of travel 7a corresponding to a left-to-right pass of the printhead and the right-hand pixels 4b were printed with a printhead direction of travel 7b corresponding to a right-to-left direction of travel 7b.

In the exemplary embodiment of FIG. 15A, the satellites or tails 41a, 41b fall outside the nominal position of the image 8 and may reduce the accuracy of the printed image. In the exemplary embodiment of a 2×2 dot, for example, the dot may appear larger than the nominally intended and expected size and shape of the dot because of the visible satellites 41a, 41b falling outside the nominal pixel positions for the image 8.

In the exemplary embodiment of FIG. 15B, on the other hand, the satellites or tails 41a, 41b are hidden within the image 8 by being printed on a pass in which the satellite or tail 41a, 41b lands on another printed pixel position 2. In an exemplary embodiment, such printing hides the satellite 41a, 41b or tail within the image 8 and may increase the edge acuity and accuracy of the printed image 8. In an exemplary embodiment, this may be the case because the satellite 41a, 41b may land in a space which is also to be printed with a main droplet 4b, 4a so that the area covered by visible ink or colorant may be closer to the intended, nominal size and shape of the image 8 or dot 81.

It is understood that for cases in which a satellite or tail is produced in a direction opposite of the direction of travel of a printhead that the pass on which an edge pixel position may be switched to hide the satellite or tail within the image. In an exemplary embodiment, a reference dot pattern may be larger than a 2×2 dot. For example, a dot pattern may be a 3×3 square, a 4×4 square or any arrangement of pixel positions which may be indicative of a dot when printed on a print medium.

It is understood that the same principles may be used to hide edge pixel satellites or tails for any image with at least two adjacent printed pixel positions. It is understood that the same principles may be used where the satellite is formed in an opposite direction by providing corresponding constraints that would forbid printing an edge pixel where the satellite would lie outside the contours of the image and would require printing an edge pixel where the satellite or tail falls within the contours of the image.

Figure 16:
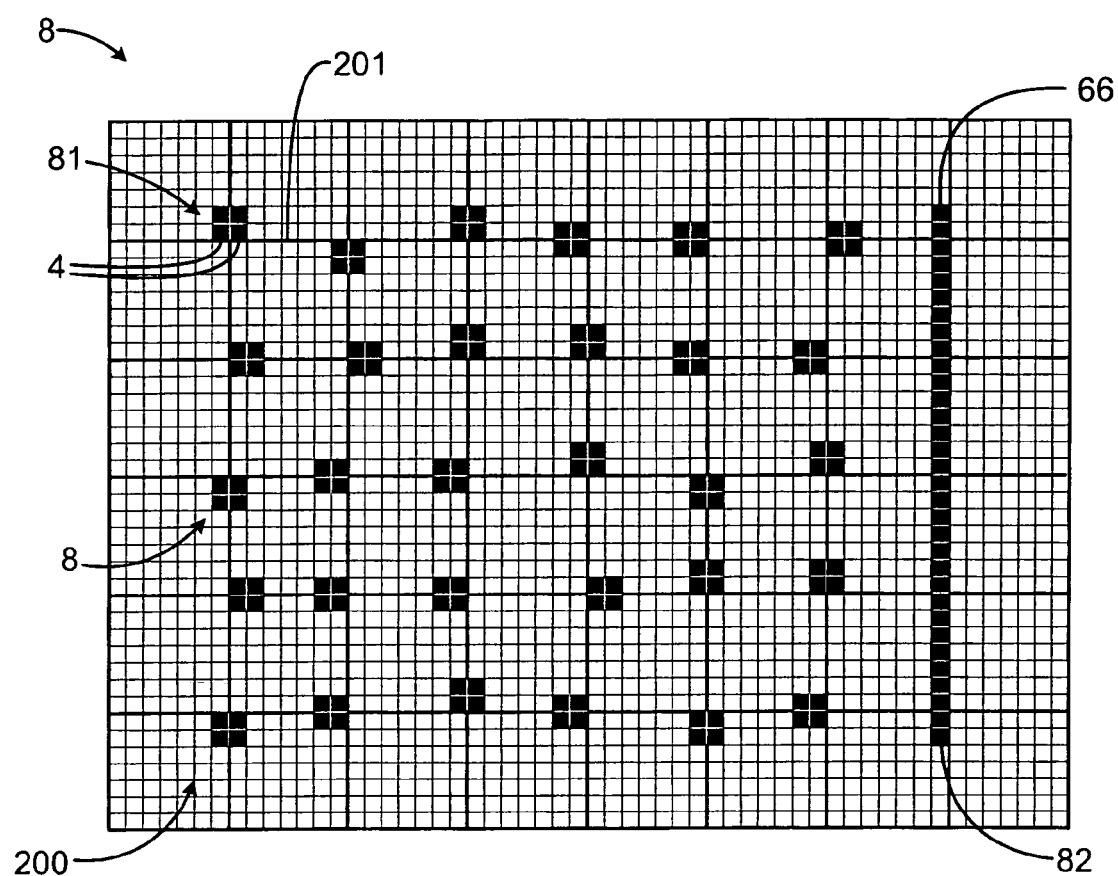
FIG. 16 illustrates an exemplary embodiment of an image to be printed.

FIG. 16 illustrates an exemplary embodiment of an image 8 in which the image is a reference dot pattern 200 of reference dots 81 for use with DPP technology. In an exemplary embodiment, hiding the satellites or tails within the dot may increase edge acuity and improve the performance of the DPP technology by producing dots closer to the nominal size and position of the dots in a dot pattern which may improve the ability of the sensors in a DPP pen to accurately determine the position of the pen on the DPP paper. In an exemplary embodiment, edge acuity may be an important quality parameter for recognition of a position of a DPP reference dot.

In an exemplary embodiment, the reference pattern 200 may be laid out with reference positions or nominal grid positions placed in a 7×7 grid 201 (at the intersection of the gridlines which are shown for reference) for 600 dpi printing. Each dot 81 may be formed from a 2×2 grouping of droplets 4 emitted at neighboring pixel positions. Each dot 81 may be located with its center on a nominal grid position or offset from the nominal grid positions by +1 or −1 up, down or to either side, left or right, from the nominal grid position. In an exemplary embodiment, the dots may be printed by a printhead 66 which may be made up of, for example, a linear array of individual nozzles 82.

Figure 17A:
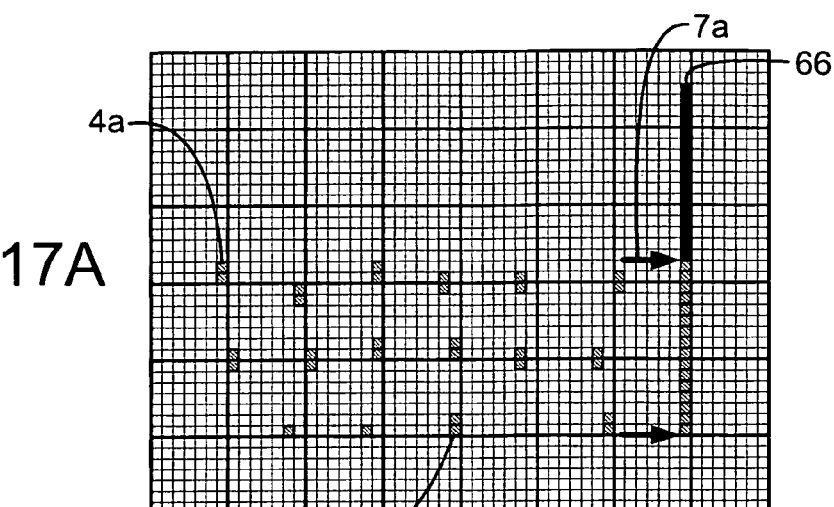
FIGS. 17A-17C illustrate exemplary stages of an exemplary embodiment of a method of printing an image.
Figure 17B:
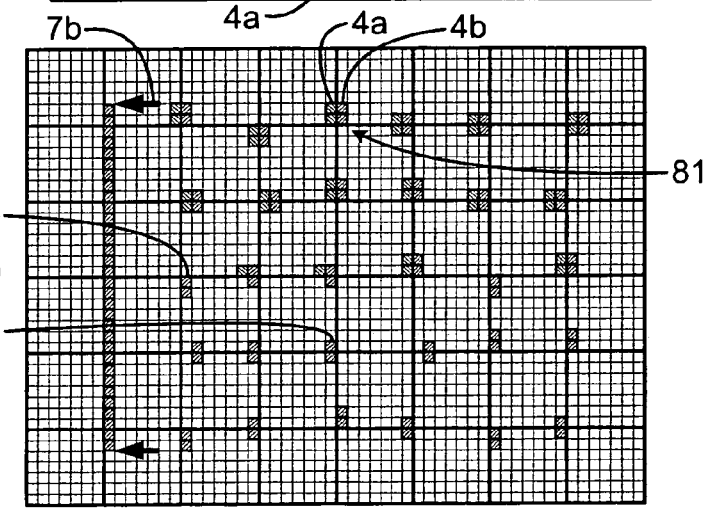
Figure 17C:
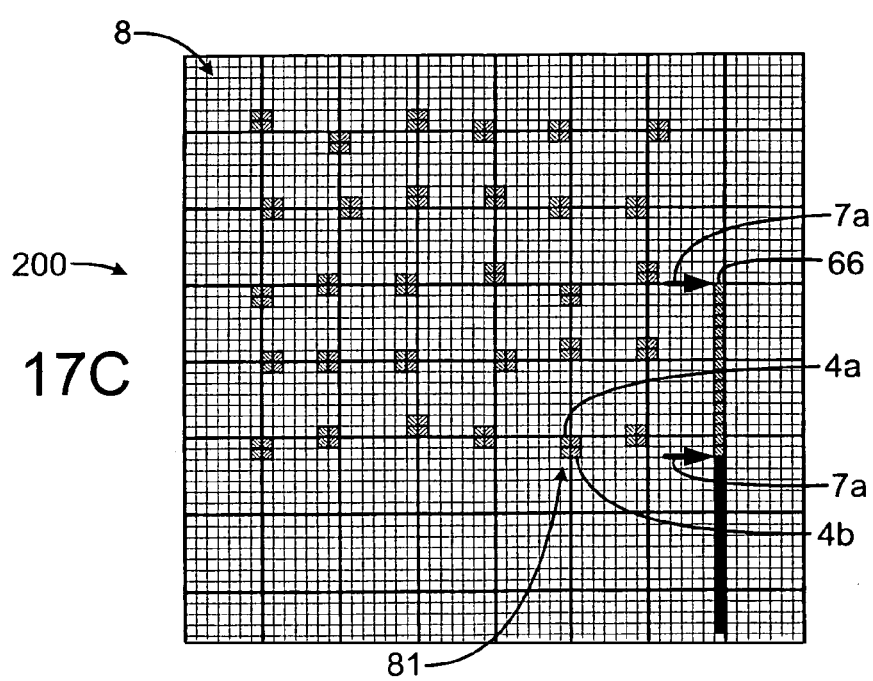

FIGS. 17A-17C illustrate stages of an exemplary embodiment of a method of printing an image 8 or pattern 200 of DPP reference dots 81. In FIG. 17A, the pixel positions 4a corresponding to the left side of dots under the lower half of the printhead (for example the lower sixteen nozzles a thirty-two nozzle wide printhead) have been printed on a first, odd-numbered, left-to-right pass. In FIG. 17B, the printhead has moved downward relative to the print medium by sixteen pixel positions (for example by moving the medium upward relative to the printhead). The pixel positions 4b corresponding to the right-hand side of the dots under the entire length of the printhead 66 have been printed in a second, even numbered, right-to-left pass of the printhead 66 across the medium. For those dots 4 which were printed partly in the first pass and partly in the second pass, the entire dot 81 has been printed in two passes, each pass in opposed directions 7a, 7b. In FIG. 17C, the printhead has again shifted downward relative to the medium and the pixel positions 4b corresponding to the left side of dots 4 under the upper half of the printhead have been printed. In an exemplary embodiment, every dot 81 in positions which have been covered by two passes have been printed. Each dot has been printed so as to hide tails or satellites within the dots to increase edge acuity of the dots 81.

Figure 18:
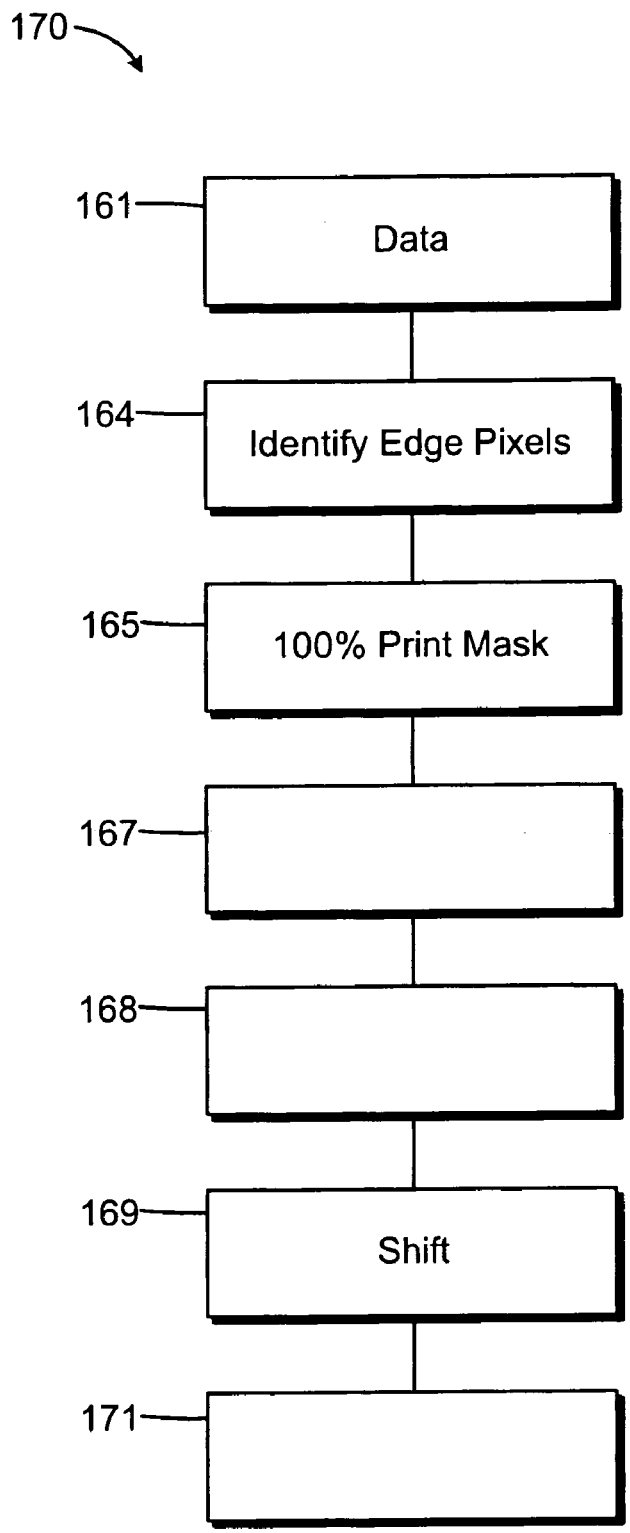
FIG. 18 illustrates an exemplary embodiment of a method of printing a reference patter of reference dots for use in digital pen and paper (DPP) technology.

FIG. 18 illustrates an exemplary method 170 of printing a pattern 200 of reference position dots 81. In an exemplary embodiment, a DPP driver 191 on host device 112, for example a computer, provides 161 the data for a reference pattern 200 to the printer 20. In an exemplary embodiment, the reference pattern 200 data may include size, spacing, nominal location and any offset of dots from their nominal location.

In an exemplary embodiment, the reference pattern includes only 2×2 dots, in which case all pixels to be printed in the pattern are edge pixels. In an exemplary embodiment with larger dots, the printer controller may analyze the pattern or image to identify 164 those pixels which are edge pixels.

In an exemplary embodiment, the method may include defining a 100 percent mask (print all). In an exemplary embodiment, the controller may define 165 the 100 percent print mask. In an exemplary embodiment, the location of one half, for example the left-side pixel positions in rows to be printed in a pass may be stored in a register in memory 105. In an exemplary embodiment, the printer 20 may print 168 the edge pixel positions, for example the left side of the dots, in a first pass.

In an exemplary embodiment, the stored position of the left side of the dots may be shifted 169 plus one pixel position to provide the position of the right side of the dots to be printed in a subsequent pass. In an exemplary embodiment, the other side edge pixel positions, for example the right side of the dots is printed 171 in a subsequent right-to-left pass. Where the right-hand pixel positions are printed first, the stored position of the right-hand side pixel positions may be shifted minus one pixel position to determine the left-hand side pixel positions to be printed in a subsequent pass.

In an exemplary embodiment, the printing of a reference pattern 200 may be performed at higher than normal pen firing frequency. In an exemplary embodiment, this may be the case because the minimum distance between two consecutive ½ dots may be 5 pixels (when two consecutive dots (from left to right) are offset to the right and to the left) and the maximum distance between outermost ½ dots may be 9 pixels (when two consecutive dots (from left to right) are offset to the left and the second to the right. In an exemplary embodiment, the frequency may be defined as a function of the printer resolution (dots/inch) and carriage speed (inches/second). For example, firing speed may be represented by resolution times speed, for instant, 600 dpi×30 ips=18 KHz, or 18000 drops per second, which may be a measure of how quickly the ink chamber may be refilled and fired consecutively. In an exemplary embodiment, this may be the printing speed which may not be exceeded to avoid problems where every single pixel is to be printed in a grid, for example a 600 dpi grid. In an exemplary embodiment, where the dot pattern may have at least five pixels distance (empty, unprinted pixels) between consecutive dots, the print carriage speed may exceed the "maximum" firing rate, where the reference dot pattern is printed alone, with other graphical content.

In an exemplary embodiment, the methods described herein may be used for printing images other than reference dot patterns. In an exemplary embodiment, hiding satellites or tails within an image may improved the appearance of a printed image by reducing the stray satellites or tails which may fall outside the nominal, expected size of the image.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for preparing a mask for multi-pass printing, comprising:
   determining a characteristic satellite drop spray pattern, a characteristic satellite drop relative weight and satellite drop constraints for printing in a multi-pass mode with a printhead;
   filling positions in a print mask ;
   creating a constraint matrix comprising satellite drop constraints weighted by the relative weight of the characteristic satellite drop;
   applying the constraint matrix to a position to be filled in the print mask;
   determining the relative favorability of a candidate pass number; and
   filling the position to be filled in the print mask with a pass number, wherein the pass numbers in a given position are selected based on considerations of interactions among main drops and satellite drops.

2. The method according to claim 1, wherein the considerations of interactions comprise at least one of drying time, non-uniform or inconsistent drying, beading, bleeding or coalescence.

3. The method of claim 1, further comprising:
   considering candidate pass numbers for a particular position in a mask;
   expressing the favorability of each candidate pass number as main constraints and as satellite constraints, wherein the main constraints reflect considerations with regard to pass numbers in main neighbor positions or to be placed into main neighbor positions, wherein the main neighbor positions neighbor the particular position, and the satellite constraints reflect considerations with respect to pass numbers in satellite neighbor positions or to be placed into satellite neighbor positions, wherein satellite neighbor positions neighbor a satellite position corresponding to the particular position;
   consolidating the constraints to obtain a measure of favorability for each candidate pass number;
   selecting one of the candidate pass numbers for use at the particular position in the mask based on the measures of favorability.

4. The method of claim 1, further comprising:
   providing directional constraints for edge pixel positions of an image to be printed.

5. The method according to claim 4, wherein the image comprises a plurality of right edge pixel positions and a plurality of left edge pixel positions, and wherein providing directional constraints comprises causing the directional constraint causes the plurality of left edge positions to be printed in passes having a first direction of printhead travel and the plurality of right edge positions to be printed in a second direction of printhead travel.

6. The method according to claim 5, wherein the plurality of left edge positions are printed in left-to-right passes and the plurality of right edge positions are printed in right-to-left passes.

7. The method according to claim 4, wherein providing directional constraints for edge pixel positions hides satellite drops within the image.

8. The method of claim 4, wherein the image comprises a pattern of reference dots for use in digital pen and paper (DPP) technology.

9. The method of claim 4, wherein the characteristic satellite drop spray pattern includes drops in a main pixel position with tails in an adjacent pixel position in a direction away from the main pixel position in a direction corresponding to a direction of travel of a printhead.

10. A method of printing, comprising:
    determining locations of a plurality of edge pixel positions of an image to be printed;
    defining a print mask to print the image, wherein edge pixel positions are printed during passes which hide a satellite drop within the image
    creating a constraint matrix comprising satellite drop constraints weighted by a relative weight of a characteristic satellite drop;
    applying the constraint matrix to a nosition to be filled in the print mask:
    determining relative favorability of a candidate nass number: and
    filling the position to be filled with a pass number.

11. The method of claim 10, wherein the plurality of edge pixel positions comprises right side edge pixel positions and left side pixel positions, and wherein the right side edge pixel positions are printed during a pass having a right- to-left direction of travel and the left side edge pixel positions are printed during a pass having a left-to-right direction of travel.

12. The method of claim 10, wherein the passes comprise movements of a printhead past a print medium.

13. The method of claim 10, wherein the passes comprise movement of a print medium past a printhead.

* * * * *

UNITED STATES PATENT AND TRADEMARK OFFICE
CERTIFICATE OF CORRECTION

| | |
|---|---|
| PATENT NO. | : 7,452,046 B2 |
| APPLICATION NO. | : 11/260006 |
| DATED | : November 18, 2008 |
| INVENTOR(S) | : Alejandro Manuel De Pena et al. |

It is certified that error appears in the above-identified patent and that said Letters Patent is hereby corrected as shown below:

In column 15, line 33, in Claim 3, delete "claim 1," and insert -- claim 1, --, therefor.

In column 16, line 32, in Claim 10, after "image" insert -- ; --.

In column 16, line 36, in Claim 10, delete "nosition" and insert -- position --, therefor.

In column 16, line 37, in Claim 10, delete "mask:" and insert -- mask; --, therefor.

In column 16, lines 38-39, in Claim 10, delete "nass number:" and insert -- pass number; --, therefor.

Signed and Sealed this

Twenty-sixth Day of May, 2009

JOHN DOLL
*Acting Director of the United States Patent and Trademark Office*